United States Patent [19]

Tomiyama et al.

[11] Patent Number: 4,855,584

[45] Date of Patent: Aug. 8, 1989

[54] METHOD FOR IDENTIFYING CERTIFICATION IDENTIFYING MEDIA

[75] Inventors: Hiroshi Tomiyama; Seishi Naito, both of Himeji, Japan

[73] Assignee: Glory Kogyo Kabushiki Kaisha, Hyogo, Japan

[21] Appl. No.: 24,161

[22] Filed: Mar. 10, 1987

[30] Foreign Application Priority Data

Mar. 13, 1986 [JP] Japan ................................. 61-55893
Mar. 13, 1986 [JP] Japan ................................. 61-55894
Mar. 13, 1986 [JP] Japan ................................. 61-55895

[51] Int. Cl.$^4$ ............................................. G11B 11/10
[52] U.S. Cl. .................................. 235/493; 235/487; 360/2; 360/40
[58] Field of Search ............... 235/462, 379, 380, 449, 235/487, 488, 493, 494; 360/2, 40, 48, 131; 380/22; 283/74, 82

[56] References Cited

U.S. PATENT DOCUMENTS 4,094,462 6/1978 Moschner ........................... 235/449
4,148,434 4/1979 Lorenzo .............................. 235/449

Primary Examiner—A. D. Pellinen
Assistant Examiner—Leon K. Fuller
Attorney, Agent, or Firm—Wenderoth, Lind & Ponack

[57] ABSTRACT

An identification recording data method for an identification medium includes the steps of printing or laminating an information identification bar code strip and then affixing a magnetic recording strip to the identification medium. A data set is encoded into N encoded data using N algorithms. The bar code strip has the N encoded data recorded thereon. The magnetic recording strip has the data set recorded thereon. The N encoded data is decoded and compared with the data set recorded on the magnetic strip. Comparision of the data yields a determination as to the integrity of the identification medium.

8 Claims, 7 Drawing Sheets

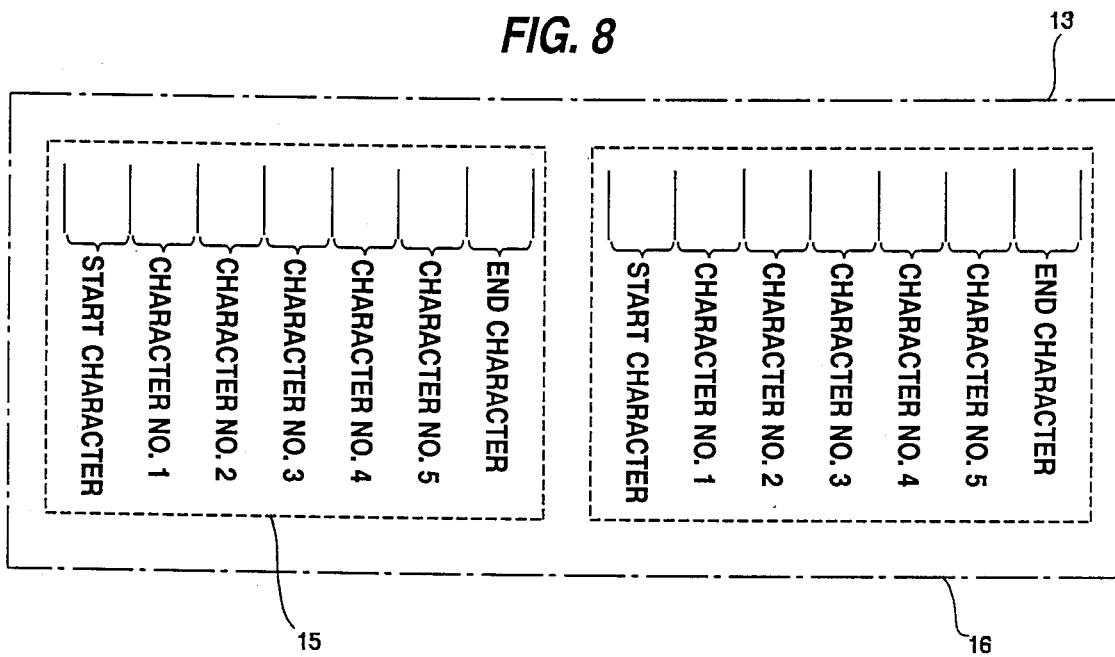
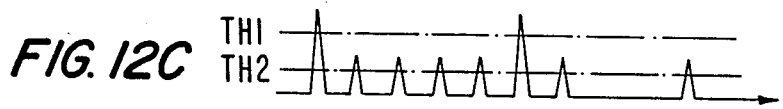
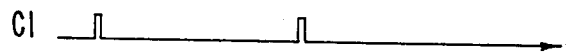

METHOD FOR IDENTIFYING CERTIFICATION IDENTIFYING MEDIA

BACKGROUND OF THE INVENTION

This invention relates to an identification and recording method for certification identifying medium used in business transactions such as pre-paid cards, personal checks, and credit cards which identification before use, and more particularly to method which can effectively prevent counterfeiting or falsification of the medium.

In the prior art, such certification identifying media, as is used for pre-paid cards, personal checks, credit cards, certification identifying cards and admission tickets, comprise a substrate made of paper or plastics which records the necessary biblographic data (information) such as numbers, names, an amount of money, etc., by printing or by magnetic recording on a magnetic tape sheet pasted on the substrate. Alternatively, the substance is provided with identification information such as photographs pasted thereon with an impression of a tally. Since such identification media have been widely used in recent years and can be easily counterfeited, many cases are reported falsified or forged Pf identification media and the abuse thereof presents a security problem.

SUMMARY OF THE INVENTION

This invention was conceived to eliminate the inconveniences encountered in the prior art and aims at providing an identification data recording method on a certification identifying medium which can prevent counterfeiting, falsification, or alteration, by encoding and recording prescribed basic data on an identification bar code position on a substrate with algorthms of n kinds, detecting and decoding the encoded data on the bar code position, further encoding the decoded basic data and finally magnetically recording the data on a magnetic recording strip.

Another object of this invention is to provide an identification method for certification identifying media which can double-check the authenticity of a medium for security purposes by further encoding basic data which have been decoded once, magnetically recording the data on a magnetic recording strip in advance, and then reading out and matching both encoded data.

According to one aspect of this invention, for achieving the objects described above, there is provided an identification data recording method for certification identifying media comprising the steps of encoding predetermined basic data into encoded data the number n with algorithms of n kinds, detecting encoded data of the number n from an information identification code strip which is printed or laminated with materials including a magnetic material, detecting encoded data of the number n from the bar code strip, decoding the data with the algorithms of n types, and when all the decoded data are found identical to the basic data stored in advance, encoding the decoded data with predetermined algorithms and magnetically recording the data on a magnetic recording strip provided on the certification identifying medium.

According to another aspect of this invention, there is provided an identification media manufacturing method comprising the steps of encoding predetermined basic data into encoded data of the number of n with algorithms of n kinds, printing or laminating respectively said encoded data in blocks with magnetic material in an identification code form, wherein said printed or laminated identification code strip comprises a first identification code including a magnetic material having a specified coercive force and a second identification code including another magnetic material having a coercive force different from the first magnetic material.

Further, according to still another aspect of this invention, there is provided an identification method for identification media which is characterized in that an identification medium having an information identification bar code strip where data in the number of n which have been encoded with algorithms of n types are either printed or laminated and a magnetic recording strip where, when all the data which have been decoded with said n type algorithms are found identical, the data are recorded magnetically, is identified by the steps of detecting the encoded data of n number from the information identification bar code strip, and by matching the data which have been formed identical with the data which have been obtained by decoding the encoded data recorded in the magnetic recording strip with the algorithms used for the magnetic recording.

The nature, principle and utility of the invention will become more apparent from the following detailed description when read in conjunction with the accompanying drawings.

BRIEF DESCRIPTION OF THE DRAWINGS

In the accompanying drawings:

FIG. 8 is a view to show an example of bar code structure to be printed on a striped bar code position;

FIG. 12A through E are time charts showing an example of operation.

DESCRIPTION OF THE PREFERRED EMBODIMENTS

According to this invention, predetermined basic data are encoded by algorithms of n kinds, and those encoded data are respectively recorded in blocks on a data identification bar code position on a medium either by printing or lamination of magnetic materials. Bars are provided at predetermined intervals on the identification bar code position which has already been recorded with the encoded data, the magnetic material used for the bars having a coercive force different from that of the magnetic materials used for the basic data. This invention recording method comprises, at the time of manufacturing a certification identifying medium, the steps of encoding predetermined basic data with algorithms of n kinds and recording the thus encoded data by either printing or laminating magnetic materials on a data identification bar code position of a medium by means of a data identification code unit, and at the time of issuing (as well as at the time of settlement of transaction) the steps of forcibly magnetizing the bar code position, detecting the residual magnetism thereon to detect the encoded data, decoding the thus detected data into the basic data with the algorithms of n kinds, encoding again the decoded basic data (and/or the data mixed with other information) with a predetermined algorithm and magnetically recording the encoded data on a magnetic recording bar position on the medium.

Figure 1:
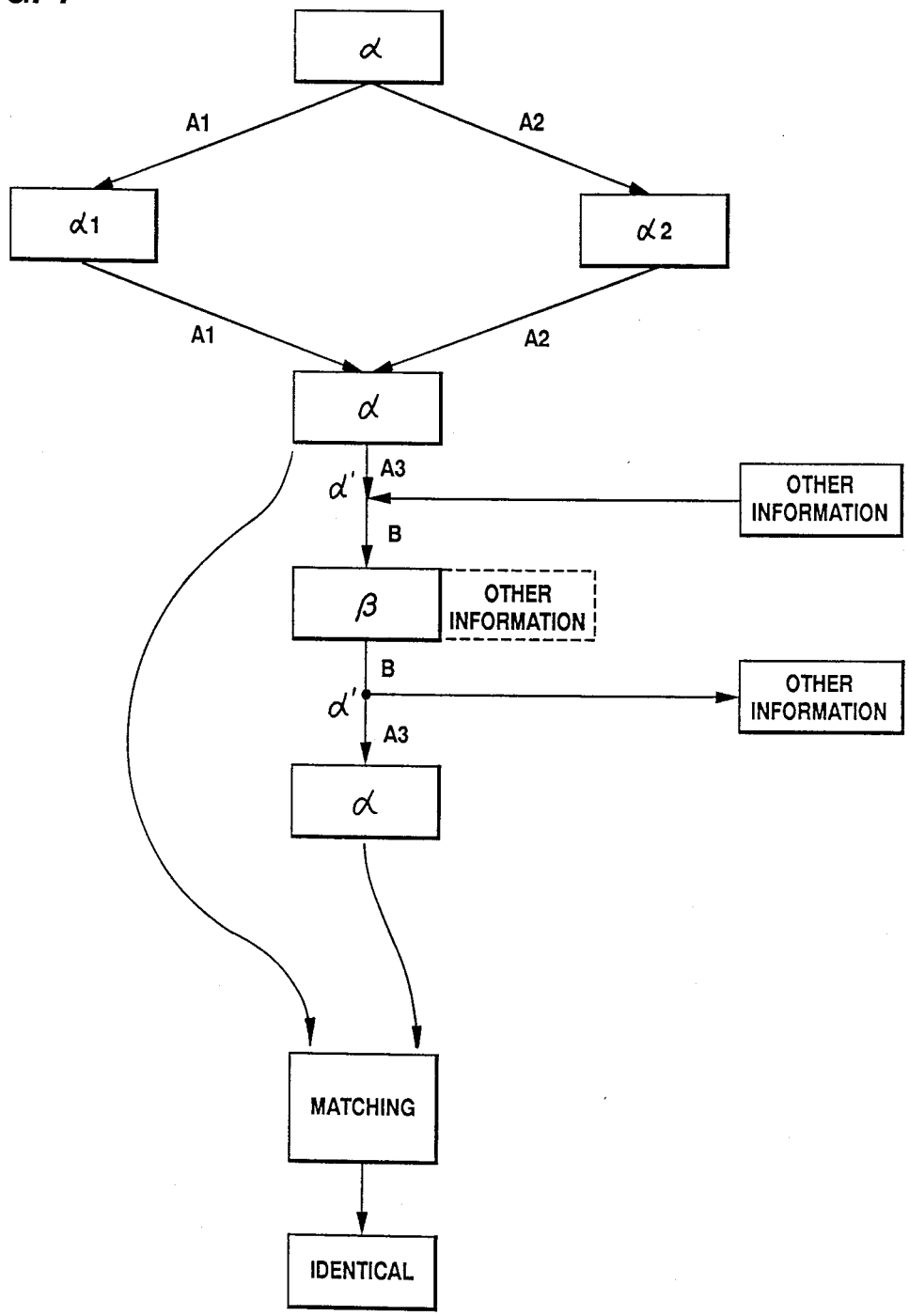
FIG. 1 is a schematic flow chart to show encoding and decoding of the data in an embodiment of the certification identifying medium according to this invention.

FIG. 1 is a schematic flow chart showing the encoding and decoding of data in an embodiment of the certification identifying media according to this invention. In this embodiment, a common key method is employed, and the data are encoded and decoded with the common key method, i.e., algorithms A1 through A3, and B.

FIG. 1 shows the content of the data, and the kinds of algorithms for encoding and decoding in the order of procedure. The data used here comprises basic data $\alpha$ which are unique for each certification identifying medium (hereinafter referred to as a medium) and which offer the reference data to match with when the medium is issued or a transaction is settled, encoded data $\alpha 1$ and $\alpha 2$ which are recorded on the bar code position when the medium is manufactured, other data on bibliography, stores, ways of settlement, etc., and encoded data $\beta$ which are magnetically recorded on the magnetic recording bar position when the medium is issued. The algorithms prepared for this invention method comprises algorithms A1 and A2 which encode basic data $\alpha$ into encoded data $\alpha 1$ and $\alpha 2$ when the medium is manufactured, and decode the encoded data $\alpha 1$ and $\alpha 2$ into the basic data $\alpha$ when the medium is issued or a transaction is settled, algorithm A3 which encodes the basic data $\alpha$ which are referred to when the medium is issued, and decodes the encoded data into the basic data $\alpha$ when a transaction is settled by means of the medium, and algorithm $\beta$ which encodes the mixed data prepared by mixing the data $\alpha$ which has been enclosed by the algorithm A3 with other information into data $\beta$ when the medium is issued, and decodes them by separating the other information from encoded data $\beta$ when the transaction is settled by means of the medium.

Figure 2:
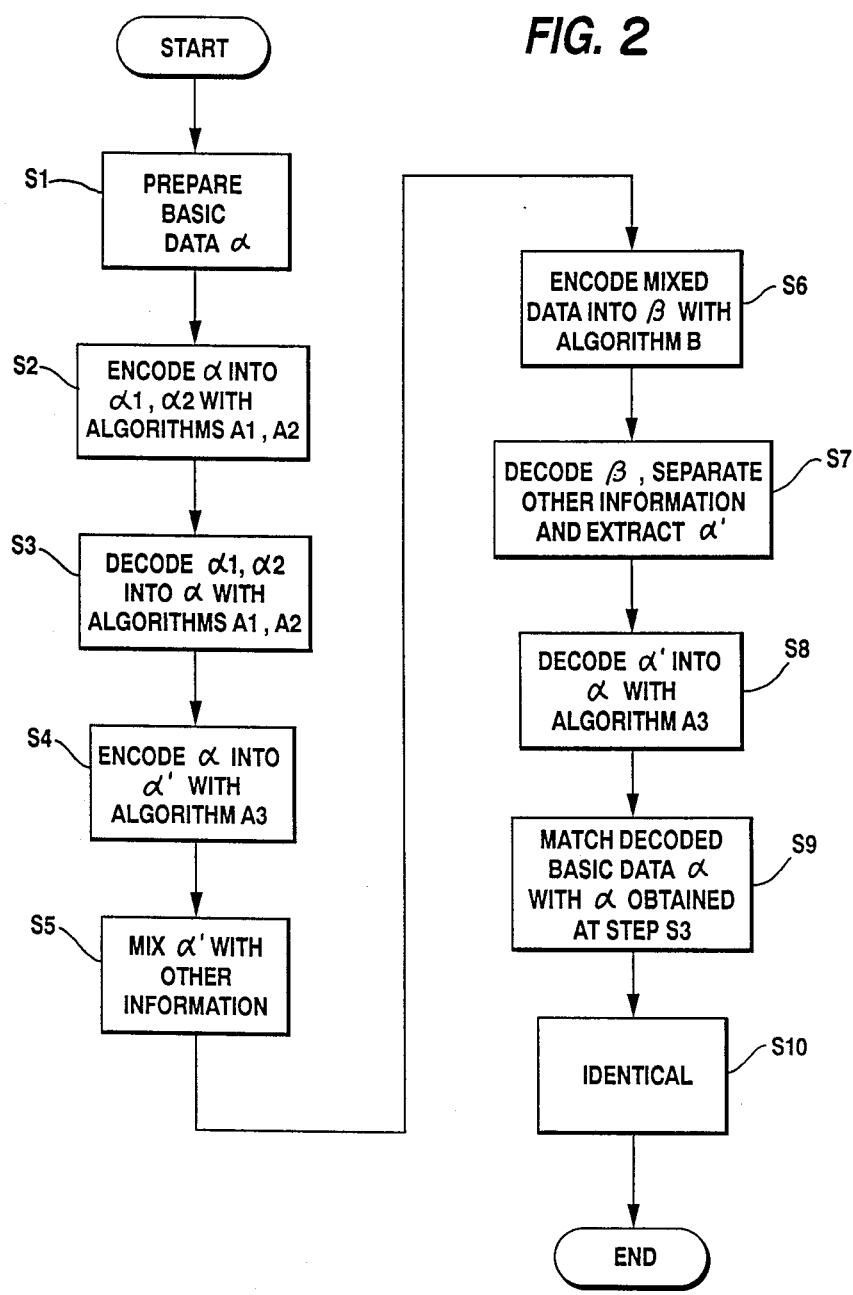
FIG. 2 is a flow chart to show the detailed operation thereof.

The operations for encoding and decoding the data on the medium shown in FIG. 1 will now be described by referring to the flow chart in FIG. 2.

When a medium is manufactured or printed, the basic data $\alpha$ are prepared for identification of each medium by a bar code printer which will be explained hereinafter and are allocated to each medium (Step S1). The basic data $\alpha$ are encoded into encoded data $\alpha 1$ and $\alpha 2$ with the algorithms A1 and A2 and printed on bar code positions on the medium (Step S2). When the medium is issued or a transaction is settled, the encoded data $\alpha 1$ and $\alpha 2$ are detected from the bar code position by an identification reading unit and decoded into the basic data $\alpha$ with the algorithms A1 and A2 (Step S3). At the time of issuance, the basic data $\alpha$ which have been obtained by the decoding are encoded into $\alpha'$ with an algorithm A3 (Step S4). The encoded basic data $\alpha'$ are mixed with other information to form mixed data (Step S5), and the mixed data are encoded with an algorithm B to prepare encoded data $\beta$, and thus encoded data $\beta$ are magnetically recorded on the magnetic recording position on the medium (Step S6). At the time of settlement, the encoded data $\beta$ are read out from the magnetic recording strip, decoded by the algorithm $\beta$ to separate other information therefrom to extract the encoded data $\alpha'$ (Step S7). The extracted data $\alpha'$ are decoded with the algorithm A3 (Step S8). The decoded basic data $\alpha$ are matched with basic data $\alpha$ obtained at the Step S3 (Step S9), and if they are identical, the medium is judged authentic to allow the output of the other information obtained at the Step S7.

Figure 3:
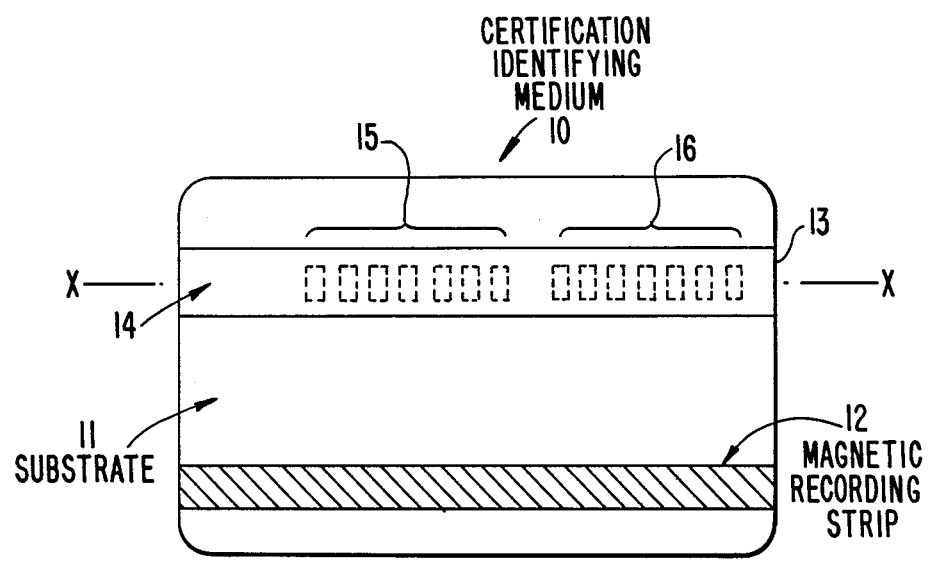
FIG. 3 is a frontal view of an embodiment of the certification identifying medium according to this invention.
Figure 4:
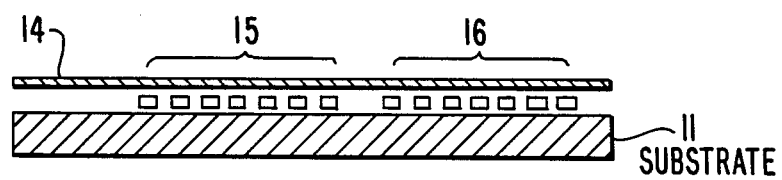
FIG. 4 is a cross sectional view along the line X—X in FIG. 3.
Figure 5:
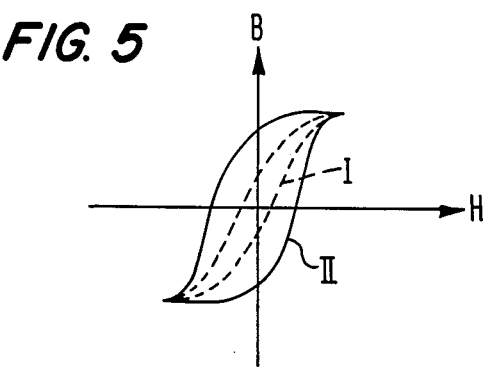
FIG. 5 is a graph showing magnetic characteristics of magnetic materials.

FIG. 3 shows a frontal view of a certification identifying medium 10 used in this invention method, and FIG. 4 is a cross sectional view along X—X thereof. A substrate 11 of the medium 10 is a rectangle having a card-like structure and made of paper material. A magnetic recording strip 12 is laminated at the position shown in the figure on the surface of the substrate 11 in a manner similar to the magnetic recording tape pasted on the credit card in the prior art. The magnetic recording strip 12 is magnetically recorded with the basic data $\alpha$ as well as other necessary bibliographic data such as numeric figures, account balance, the name of issuer, etc. A bar code strip 13 provided on the upper portion of the substrate 10 is printed with bar codes 15 and 16 (by press printing). More specifically, when the medium 10 is manufactured, the bar codes 15 and 16 on the substrate 11 are printed (or laminated) by a bar code printer respectively with the encoded data $\alpha 1$ and with the encoded data $\alpha 2$ in an ink having a magnetic material of a predetermined coercive force. FIG. 5 is a graph showing an example of characteristics of magnetic materials. The bar code position 13 on which the bar codes 15 and 16 are printed is coated with a mask strip 14 made of an opaque non-magnetic material so that users or other parties cannot recognize the bar codes 15 and 16 underneath the mask strip 14. The mask strip 14 may extend to cover the 2 surface of the entire substrate 11 and may be printed with suitable illustrations or characters.

Figures 6, 7:
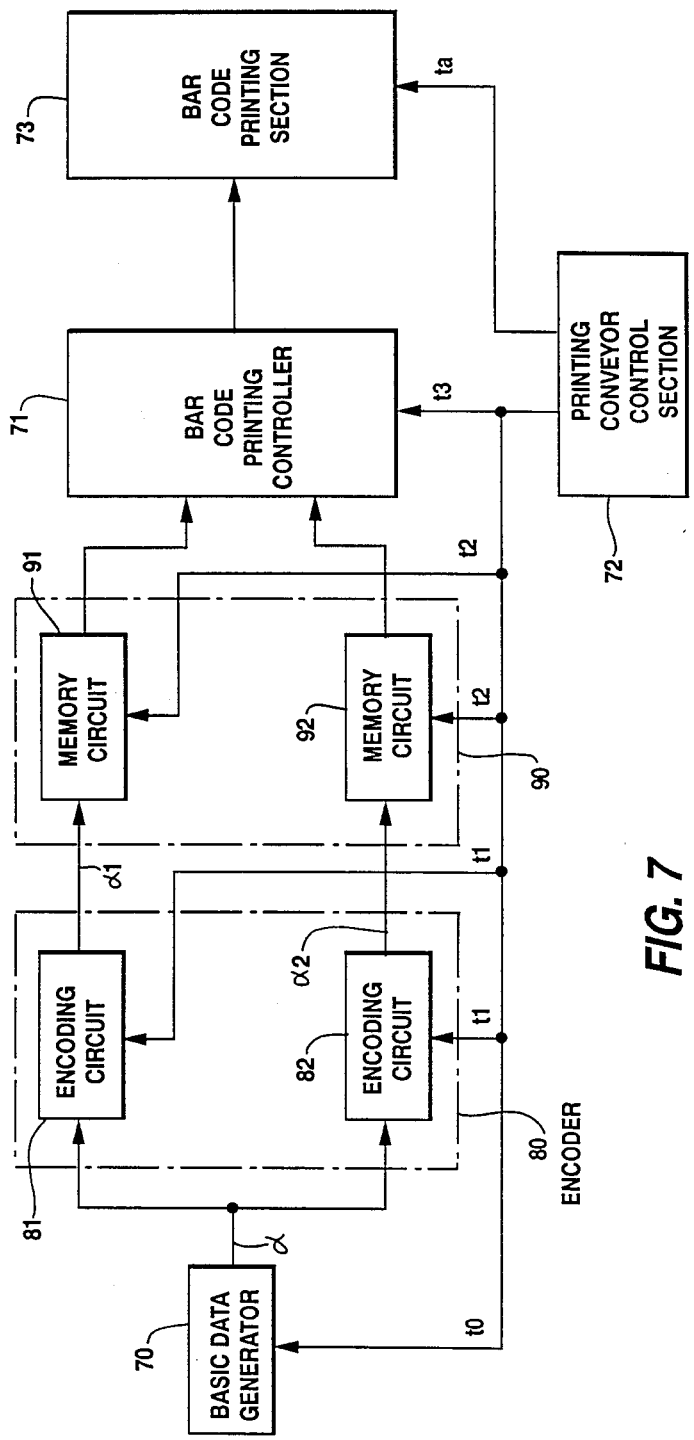
FIG. 6 is a block diagram of a bar code printing unit.
FIG. 7 is a chart showing the relation between basic data $\alpha$ and encoded data.

FIG. 6 is a block diagram of a bar code printer which prints encoded data $\alpha 1$ and $\alpha 2$ on the bar codes 15, 16 of the medium 10. The bar code printer includes a basic data generator 70 which generates basic data $\alpha$ for each individual medium, and the basic data $\alpha$ from the basic data generator 70 are inputted to an encoder 80. The encoder 80 comprises encoding circuits 81 and 82 which encode inputted basic data $\alpha 1$ and $\alpha 2$ respectively with the above mentioned algorithms A1 and A2. The encoded data $\alpha 1$ and $\alpha 2$ from the encoder 80 are inputted to a memory 90 which comprises memory circuits 91 and 92 for respectively storing the encoded data $\alpha 1$ and $\alpha 2$. The encoded data $\alpha 1$ and $\alpha 2$ read out from the memory 90 are inputted to a bar code printing controller 71 which controls a bar code printing section 73. The output from the bar code printing controller 71 is inputted to the bar code printer 73 which prints bar codes 15 and 16 on the medium 10. The bar code printer is provided with a printing conveyor control section 72 for controlling each section which inputs timing signals $t_0$ at the basic data generator 70, timing signals $t_1$ respectively at the encoding circuits 81 and 82 in the encoder 80, timing signals $t_2$ at the memory circuits 91 and 92 in the memory 90, timing signals $t_3$ at the bar code printing controller 71 and timing signals $t_a$ to the bar code printing section 73 to synchronize them.

The printing conveyor control section 72 causes the basic data generator 70 to generate a basic data $\alpha$ of, for instance 5 digits, by inputting a timing signal $t_0$ thereto, and causes the encoder 80 to encode the basic data $\alpha$ into the encoded data $\alpha 1$ and $\alpha 2$ of characters No. 1 through No. 5 with the algorithms of the encoding circuits 81 and 82 by inputting the timing signal $t_1$ to the encoder 80. The control section 72 then causes the memory circuits 91 and 92 to store the prepared encoded data $\alpha 1$ and $\alpha 2$ with the timing signal $t_2$. When the medium 10 is inserted into the bar code printing section 73 of the bar code printer, the control section 72 drives the bar code printing controller 71 with the timing signal $t_3$ and at the same time sends the timing signal $t_a$ to the bar code printing section 73 so as to print each character of the encoded data $\alpha 1$ and $\alpha 2$ in the form of the bar codes 15 and 16 on the bar code strip 13 on the medium 10.

FIG. 8 shows an embodiment of the bar codes 15 and 16 printed at the bar code strip 13. Each of the codes has 7 characters from the start character to the end character. A fixed data indicating the start of a bar code block is recorded at the start character while a fixed data indicating the final end of the bar code block is recorded at the end character. The encoded data $\alpha 1$ and $\alpha 2$ are recorded in a predetermined format in characters No. 1 through No. 5. The number of characters in each bar code may be arbitrarily determined.

Figure 9:
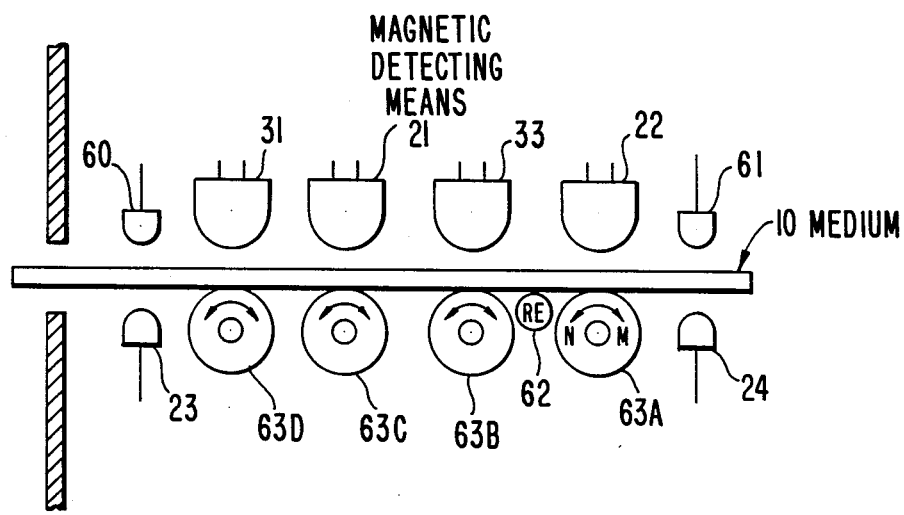
FIG. 9 is a view showing a reading-out/writing-in section of an identification reading unit.
Figure 10:
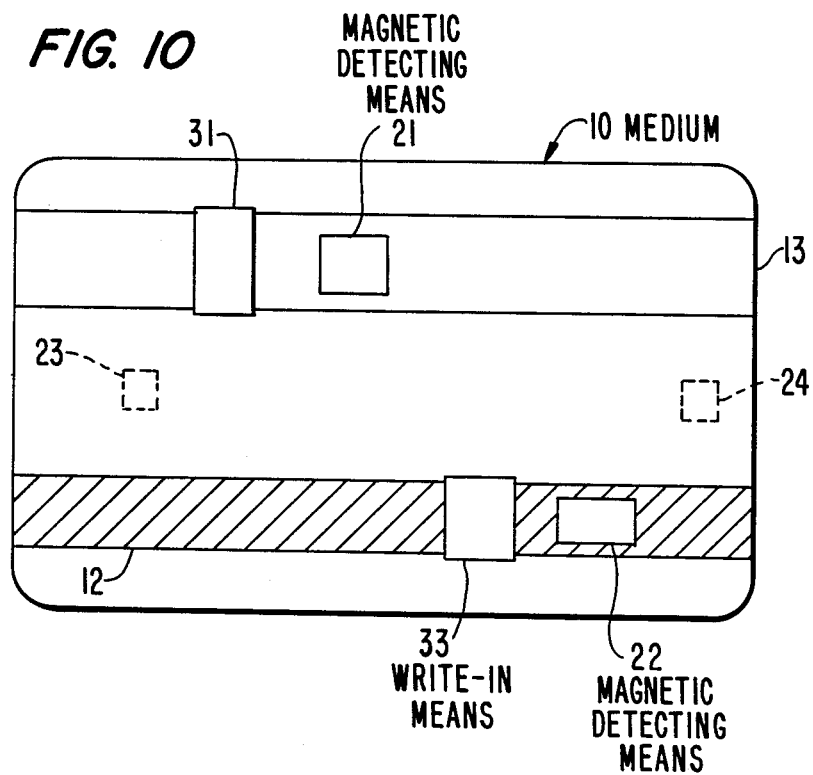
FIG. 10 is a view showing the positional relation between a medium, sensors and write-in/read-out means.

FIGS. 9 and 10 shows an embodiment of the internal structure of the identification reader which is used for issuing of the medium 10 and settling a transaction, and more particularly the data read-out/write-in section. The structure is provided with sensor light source 60, 61 such as lamps, and sensors 23, 24 such as photo-diodes corresponding to the light sources which detect the passage of the medium 10 at suitable intervals. Between these sensors 23 and 24 are operatively arranged rollers 63A through 63D which convey the medium 10 into or out of the reader, a magnetizing/demagnetizing means 31 which is positioned above the rollers 63C, 63D to face the bar code strip 13 and to magnetize or demagnetize the bar code strip 13 on the medium 10, and a magnetic detecting means 21 which magnetically detects data from the bar code strip 13 which has been magnetized data from the bar code strip 13 which has been magnetized by the magnetizing/demagnetizing means 31. The structure further includes a write-in means 33 for magnetically writing the data on the recording strip 12 and a magnetic detecting means 22 for magnetically detecting the written-in data at positions above the magnetic recording strip 12 further inside of the means 31 and 21. A rotary encoder 62 is operatively provided between the rollers 63A and 63B which detects the conveyed distance of the medium 10 and sends timing signals.

The structure having such rollers 63A through 63D can convey the medium 10 in or out by driving the rollers in the normal or reverse direction. The position of the medium 10 can be monitored by the rotary encoder 62 and the data on the bar code can be detected by the magnetic detecting means 21 above the bar code strip 13. Similarly, the data is written-in the magnetic recording strip 12 on the medium 10 by a write-in means 33, and the written-in data is detected by the magnetic detecting means 22. If the write-in operation and the detection are to be processed simultaneously, both operations can be easily done concurrently by simply moving the medium 10 reciprocally.

Figure 11:
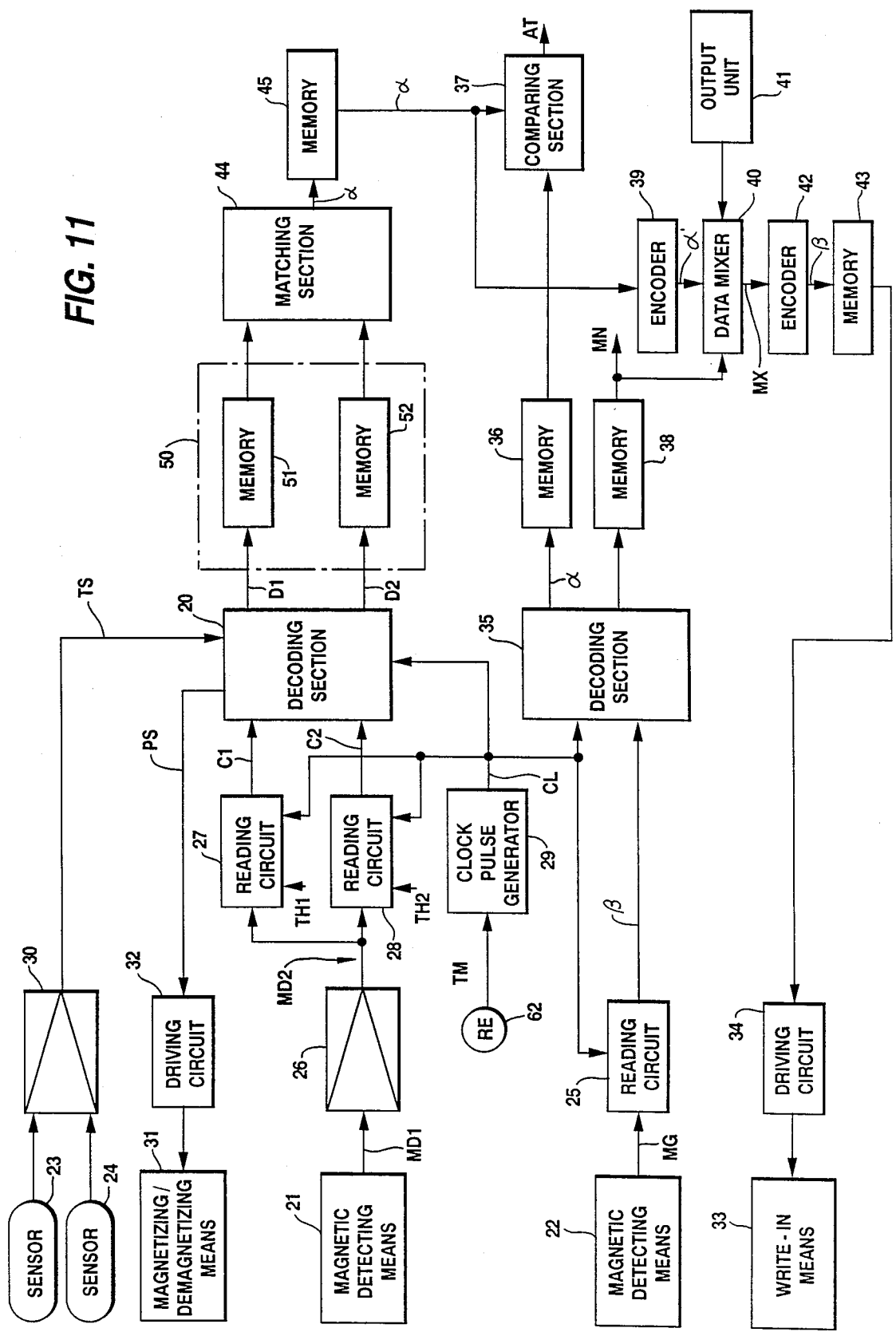
FIG. 11 is a block diagram showing the inside of an identification reading unit.

FIG. 11 is a block diagram showing an embodiment of an identification reader according to this invention wherein signals from the sensors 23 and 24 are respectively inputted to an amplifier 30, the signals TS from the amplifier 30 are inputted to a detecting section 20 which decodes encoded data $\alpha 1$ and $\alpha 2$ from the digital signals C1 and C2 read by the reading circuits 27 and 28 with the algorithms A1 and A2 to actuate the decoding section 20. The operation signals PS from the decoding section 20 are inputted to a driving circuit 32 which drives the magnetizing/demagnetizing means 31 with the signals from the driving circuit 32. The signals MD1 from the magnetic detecting means 21 are inputted to an amplifier 26, the signals MD2 of the bar code strip 13 which has been amplified at the amplifier 26 are inputted to the reading circuits 26, 28 and the digital signals C1, C2 processed by the reading circuit 27, 28 are inputted to the encoding section 20. The reading circuits 27, 28 and the decoding section 20 are inputted with clock pulses CL from a clock pulse generator 29, and the clock pulse generator 29 is inputted with timing signals TM from the rotary encoder 62 to control relative timings. The magnetically recorded data MG (or encoded data $\beta$) which have been read out by the magnetic detecting means 22 are inputted to a reading circuit 25, and the encoded data $\beta$ from the reading circuit 25 are inputted to a decoding section 35 which decodes the data $\beta$ into the basic data $\alpha$ and other information with the algorithms A3 and B. The reading circuit 25 and the decoding section 35 also inputted with clock pulses CL from the clock pulse generator 29 for synchronizing the timings. The data D1 and D2 which have been decoded in the decoding section 20 are inputted to memories 51 and 52 in a memory circuit 50 respectively, and referred to the data D1 and D2 stored in the memory circuit 50, and if all of the data are found identical with the basic data $\alpha$, they are inputted to the matching section 44 for outputting the basic data $\alpha$, which is in turn inputted to a memory 45.

The basic data $\alpha$ which have been decoded in the decoding section 35 are inputted and stored at a memory 36, and then inputted to a comparing section 37 to be compared with the basic data $\alpha$ stored at the memory 45, and if they are identical, the comparing section 37 outputs identification signal AT. The other information decoded in the decoding section 35 are inputted to a memory 38 and outputted as magnetically recorded data MN. the basic data $\alpha$ which have been read out from the memory 45 are inputted to an encoder 39 which encodes the basic data $\alpha$ with the algorithm A3. The encoded data $\alpha'$ from the encoder 39 are inputted to a data mixer 40 which mixes the other information from the memory 38 or the other information from an output unit 41 with the data. The mixed data MX are inputted to an encoder 42 for encoding them into encoded data $\beta$ with the algorithm B, and the encoded data $\beta$ from the encoder 42 are inputted to a memory 43. The encoded data $\beta$ stored in the memory 43 are inputted to the driving circuit 34 which drives the write-in means 33 so that the encoded data $\beta$ are magnetically recorded on the magnetically recording strip 12 on the medium 10 with the write-in means 33.

An operation for issuing the medium 10 will be described below.

When the medium 10 is conveyed from a depot (not shown) of the identification reader, the medium 10 is detected by the sensor 23 and the detection signals are inputted to the encoding section 20 via the amplifier 30. This actuates the rollers 63A through 63D in the direction indicated by the letter M in FIG. 9 so as to advance the medium 10 into the reader, and the encoding section 20 drives the driving circuit 32 to actuate the magnetizing/demagnetizing means 31 in order to sequentially magnetize the bar codes 15 and 16 which have already been printed on the bar code strip 13 of the medium 10. As they are magnetized, the data on the bar codes 15 and 16 can be detected by sequentially the magnetic detecting means 21 as the medium is advanced through the reader. Since the bar codes 15 and 16 are printed on the bar code strip 13 of the medium 10 as encoded data $\alpha1$ and $\alpha2$ by the bar code printer mentioned above in relation to FIG. 6, the data detected by the magnetic detecting means 21 are the encoded data $\alpha1$ and $\alpha2$. The signal MD1 detected by the magnetic detecting means 21 are inputted to the reading circuits 27 and 28 via the amplifier 26, and digital signal C1 is outputted from the reading circuit 27 while the digital signal C2 is outputted from the reading circuit 28.

The bar code strip 13 is printed with the bar code 15 and 16 in the form of characters as shown in FIG. 8. For simplification's sake, a explanation will only be as given to the start character and the character No. 1 by referring to FIG. 12A for read-out operation.

As shown in FIG. 12A, each character comprises a trigger bar S1, S2 and data bar K1, K2 consisting of four bars each. The bars in characters are printed in magnetic materials having a predetermined coercive force as shown in FIG. 5. In this embodiment, a magnetic material having a higher coercive force shown by II in FIG. 5, is used for printing the trigger bars S1 and S2 while another magnetic material having a low coercive force is used for printing or laminating the data bars K1 and K2. The data in each data bar K1 and K2 comprises, for instance, 4 bits and data is recorded by the presence/absence of the printed bars within the data bar K1 and K2 (for instance, those marked with a dotted line of the data bar K2 in the first character). Accordingly, when the start character and the character No. 1 of the bar code 15 are detected by the magnetic detecting means 21, the amplifier 26 outputs waveform MD2 as shown in FIG. 12B. Since the trigger bars S1 and S2 are formed with the magnetic material having a higher coercive force, a waveform having a higher waveform values is detected while as the data bars K1 and K2 are formed with the magnetic material having a lower coercive force, the waveform of the lower waveform values is detected. The detected signals MD2 of the bar codes are to be inputted to the reading circuits 27 and 28. The reading circuit 27 is provided with a threshold level TH1 shown in FIG. 12C while the reading circuit 28 is provided with a threshold level TH2. Therefore, the reading circuit 27 outputs digital signals C1 which are binarized at the threshold level TH1 and at the timing shown in FIG. 12D, and zone timings of the bars within a character are calculated. The reading circuit 28 outputs digital signals C2 of FIG. 12E which have been binarized with the threshold level TH2, and the presence/absence of bar prints from above mentioned zone timing the first through fifth characters (No. 1∼No. 5) using the digital signals C2 as trigger timings. Since a trigger bar is always printed at the beginning of each character with a magnetic material having a coercive force different from that of data bars, the data on characters can be extracted separately. Using the fixed data on the end characters, the bar codes 15 and 16 can be differentiated from each other.

The decoding section 20 decodes the digital signals C1 and C2 which have been read by the reading circuit 27 and 28 with the algorithms A1 and A2 and stores the decoded data at the memories 51 and 52. Meanwhile, the medium 10 has been advanced through the reader, and when it has passed the location where the sensor 24 is located, the decoding section 20 reverses the rotation of the rollers 63A through 63D in the direction of N in FIG. 9 to guide it to a predetermined position.

The matching section 44 matches the decoded data stored at the memories 51 and 52 and, when they are identical, generates the basic data $\alpha$ to be stored at the memory 45. The encoder 39 encodes the stored basic data $\alpha$ into $\alpha'$ with the algorith A3. Other information data are fed from the output unit 41 to the data mixer 40 to be mixed with the data $\alpha'$ which have been encoded in the encoder 39 for preparation of mixed data MX. The mixed data are inputted to the encoder 42 and encoded with the algorithms B to be stored at the memory 43. When encoding ends, the memory 43 inputs the data $\beta$ at the driving circuit 34 to actuate the write-in means 33. Simultaneously, the decoding section rotates the rollers 63A through 63D in the direction M in FIG. 9 again to take in the medium 10 so that the encoded data $\beta$ can be magnetically recorded on the magnetic strip 12 of the medium 10. When this recording ends, the decoding section 20 rotates the rollers 63A through 63D in the direction N to recode the medium 10, and at the same time actuates the magnetizing/demagnetizing means 31 to demagnetize the residual magnetism left on the bar codes 15 and 16.

The settlement method using the medium 10 will now be described. Similar to the issuance of the medium, when the medium 10 is inserted into the identification reader, the bar codes 15 and 16 are magnetized by the magnetizing/demagnetizing means 31, the data on the bar codes 15 and 16 are detected by the magnetic detection means 21, digital signals C1 and C2 are obtained by the reading circuits 27 and 28, the data are decoded in the decoding section 20 and stored at the memories 51 and 52, and the basic data $\alpha$ are outputted from the matching section 44 to be stored at the memory 45 in the manner similar to the above.

The rollers 63A through 63D are rotated in the direction N in FIG. 9 to move the medium 10 to a predetermined position, and then reversed to take it back into the unit. Meanwhile, the magnetic detecting means 22 reads the encoded data $\beta$, the data $\beta$ are decoded by the decoding section 35 with the algorithms B and A3 to be divided into the other information and the basic data $\alpha$ so that other information are stored at the memory 38 as well as outputted as the magnetic recording data MN. The basic data $\alpha$ are stored at the memory 36. The comprising section 37 compares the basic data $\alpha$ stored at the memory 45 with the basic data stored at the memory 36, and when they are identical, outputs identification signals AT to certify that the medium 10 is an authentic card.

The rollers 63A through 63D are reversed in the direction N to move the medium 10 reversely. At the same time, the data which are newly created by the settlement are inputted to the memory 38. The other data and the data $\alpha'$ which had been encoded at the encoder 39 in the above manner are mixed at the data mixer 40, encoded at the encoder 42 to the data $\beta$, and magnetically recorded at the magnetic recording strip 12 on the medium 10 by the write-in means 33. The decoding section 20 causes the magnetizing/demagnetizing means 31 to demagnetize the residual magnetism on the bar codes 15 and 16.

Although two algorithms A1 and A2 are used as the algorithm for encoding and decoding of data in the aforementioned embodiment, algorithms of n kinds may be used for encoding data into encoded data of the number n, and for decoding encoded data in the number n. The data which are to be inputted to the memory for other information data for settlement may be inputted to the output thereof or the data which are to be inputted for issuance may be inputted to the other information data memory. Although the embodiment shown in FIG. 11 incorporates the issuance section and the settlement section integrally, there may be incorporated separately. Although they are integrally structured in the embodiment of FIG. 11, they may have separates structures.

According to this invention method for data recording for identification media and the method for manufacturing such media, as the data which are to be recorded on a data identification code strip on a medium are encoded with plural algorithms, the method can effectively prevent copying of the medium with magnetic ink, falsification with adhesive tape or other alterations and counterfeits. Falsification of this invention medium is impossible, as a matter of fact, since tight security in transactions is secured not only because the data to be recorded on the identification code strip and magnetic recording strip are encoded with plural algorithms but also because the decoded data obtained when all the encoded data on the code strip are decoded and found identical are matched with the data decoded of the data from the magnetic recording strip.

It should be understood that many modifications and adaptations of the invention will become apparent to those skilled in the art and it is intended to encompass such obvious modifications and changes in the scope of the claims appended thereto.

What is claimed is:

1. An identification data recording method for a certification identifying medium, comprising the steps of:
    encoding predetermined basic data into N encoded data using N algorithms, wherein N is a positive integer;
    detecting N encoded data from an information identification code strip, said information identification code strip being printed or laminated on said certification identifying medium with magnetic materials;
    decoding said detected N encoded data using said N algorithms;
    comprising said decoded detected N encoded data with said basic data;
    encoding said decoded detected N encoded data using said N algorithms when said compared data is identical; and,
    recording said encoded data on a magnetic recording strip, said magnetic recording strip being provided on said certification identifying medium.

2. An identification data recording method for a certification identifying medium as claimed in claim 1, further comprising the steps of:
    magnetizing said magnetic material;
    wherein said magnetic materials comprise a first magnetic material having a first coercive force and a second magnetic material having a second coercive force which is different from the first coercive force,
    wherein said information identification code strip comprises a first identification code printed or laminated with said first magnetic material, and a second identification code printed or laminated with said second magnetic material, and
    wherein said step of detecting N encoded data is effected by detecting a residual magnetism of said magnetic materials.

3. An identification data recording method for a certification identifying medium as claimed in claim 2, further comprising the step of demagnetizing said magnetic materials after said step of detecting a residual magnetism.

4. A method of manufacturing an identification medium comprising the steps of:
    encoding predetermined basic data into N encoded data using N algorithms, wherein N is a positive integer;
    printing or laminating said N encoded data with blocks of a first and second magnetic material on an identification code strip;
    wherein said identification code strip comprises a first identification code comprising said first magnetic material having a first coercive force and a second identification code comprising said second magnetic material having a second coercive force different from that of said first magnetic material.

5. The identification media manufacturing method as claimed in claim 4, further comprising the step of coating said identification code strip with an opaque non-magnetic material so that said N encoded data thereon is obscured from view.

6. An identification method for an identification medium, comprising the steps of:
    printing or laminating an information identification bar code strip on the identification medium, said information identification bar code strip having recorded thereon N encoded data, wherein said N encoded data is obtained from a data set using N algorithms, and wherein N is a positive integer;
    affixing a magnetic recording strip to said identification medium, said magnetic recording strip having recorded thereon said data set;
    decoding said N encoded data using said N algorithms;
    comparing said decoded N encoded data with said data set recorded on said magnetic recording strip, thereby checking the integrity of said identification medium.

7. An identification method as claimed 6, further comprising the step of:
    magnetizing, before said step of decoding, said information identification bar code;
    wherein said information identification bar code comprises a first magnetic material having a first coercive force and a second magnetic material having a second coercive force different from said first coercive force.

8. An identification method as claimed 7, further comprising the step of:
    demagnetizing, after said step of decoding, said information identification bar code.

* * * * *